(12) United States Patent
Choi

(10) Patent No.: US 8,696,182 B2
(45) Date of Patent: Apr. 15, 2014

(54) DISPLAY DEVICE AND BACKLIGHT UNIT FOR IMPROVING UNIFORMITY OF BRIGHTNESS

(75) Inventor: Hyun Ho Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 357 days.

(21) Appl. No.: 12/679,185

(22) PCT Filed: Dec. 1, 2008

(86) PCT No.: PCT/KR2008/007089
§ 371 (c)(1),
(2), (4) Date: Mar. 19, 2010

(87) PCT Pub. No.: WO2009/069988
PCT Pub. Date: Jun. 4, 2009

(65) Prior Publication Data
US 2010/0254157 A1    Oct. 7, 2010

(30) Foreign Application Priority Data
Nov. 30, 2007    (KR) .................. 10-2007-0123266

(51) Int. Cl.
*F21V 7/04*    (2006.01)
(52) U.S. Cl.
USPC ........... 362/606; 362/600; 362/611; 362/615; 362/616; 362/617
(58) Field of Classification Search
None
See application file for complete search history.

(56) References Cited

U.S. PATENT DOCUMENTS

| | | | |
|---|---|---|---|
| 6,191,833 B1 * | 2/2001 | Hirakata | 349/61 |
| 7,072,544 B2 * | 7/2006 | Cornelissen et al. | 385/31 |
| 2004/0156000 A1 * | 8/2004 | Roska et al. | 349/117 |
| 2006/0012879 A1 * | 1/2006 | Johnson et al. | 359/500 |

FOREIGN PATENT DOCUMENTS

| | | |
|---|---|---|
| JP | 2001-256815 A | 9/2001 |
| JP | 2002-197903 A | 7/2002 |
| JP | 2003-036717 A | 2/2003 |
| JP | 2003-281924 A | 10/2003 |
| JP | 2005-294137 A | 10/2005 |

OTHER PUBLICATIONS

English machine translation of Yoshino et al. (JP 2003-281924).*

* cited by examiner

*Primary Examiner* — Natalie Walford
(74) *Attorney, Agent, or Firm* — Birch, Stewart, Kolasch & Birch, LLP

(57) ABSTRACT

Disclosed are a display device and a backlight unit. The display device comprises a flexible light guide plate, a light source disposed at one side of the light guide plate, and a support member disposed in opposition to the light guide plate and the light source to support the light guide plate. The support member allows the light source and the light guide plate to have constant interval therebetween, and prevents the light source and the light guide plate from being tilted each other. The display device and the backlight unit ensure improved brightness and brightness uniformity.

18 Claims, 2 Drawing Sheets

DISPLAY DEVICE AND BACKLIGHT UNIT FOR IMPROVING UNIFORMITY OF BRIGHTNESS

CROSS-REFERENCE TO RELATED APPLICATIONS

This application is the U.S. national stage application of International Patent Application No. PCT/KR 2008/007089, filed Dec. 1, 2008, which claims priority to Korean Application No. 10-2007-0123266, filed Nov. 30, 2007, the disclosures of each of which are incorporated herein by reference in their entirety.

TECHNICAL FIELD

An present embodiment relates to a display device and a backlight unit.

BACKGROUND ART

As an information processing technology has been developed, flat display devices such as LCDs, AMOLEDs and PDPs have been extensively used.

Such flat display devices must have a slim structure and uniform brightness.

DISCLOSURE OF INVENTION

Technical Problem

The embodiment provides a flexible display device and a backlight unit, capable of ensuring superior and uniform brightness.

Technical Solution

A display device according to an embodiment comprises a flexible light guide plate, a light source disposed at one side of the light guide plate, and a support member accommodating the light source and a part of the light guide plate to fix and support the light source and the light guide plate.

A backlight unit according to an embodiment comprises a light source emitting light, a light guide plate, in which a light incident region having a light incident surface onto which light is incident and a light exit region through which the incident light is emitted are defined, and a support member fixing and supporting the light source and the light incident region.

A display device according to an embodiment comprises a flexible light guide plate, a light source disposed at one side of the light guide plate, and a rigid support member, which adheres to a part of the light guide plate and is electrically connected to the light source while fixing the light source.

Advantageous Effects

The display device and the backlight unit according to the embodiment comprise the flexible light guide plate. That is, as a thickness of a light guide plate is reduced, the light guide plate has flexible property, or the flexible display device or the backlight unit can have the flexible light guide plate.

The display device and the backlight unit according to the embodiment comprise a support member for supporting and fixing a part of the light guide plate.

Thus, according to the display device and the backlight unit of the embodiment, the light source and the light guide plate are prevented from being spaced apart or tilted from each other due to the bending of the light guide plate.

In particular, the support member supports and fixes a light incident region of the light guide plate onto which light is incident such that a light exit surface of the light source and a light incident surface of the light guide plate maintain a constant interval therebetween.

Accordingly, light generated from the light source can be effectively incident onto the light guide plate.

The display device and the backlight unit according to the embodiment can have the superior and uniform brightness.

In addition, the display device and the backlight unit according to the embodiment can comprise a thin or a flexible light guide plate without degrading brightness or brightness uniformity.

Accordingly, the display device and the backlight unit according to the embodiment can be realized in slim or flexible structure without degrading brightness or brightness uniformity.

BEST MODE FOR CARRYING OUT THE INVENTION

Figure 1:
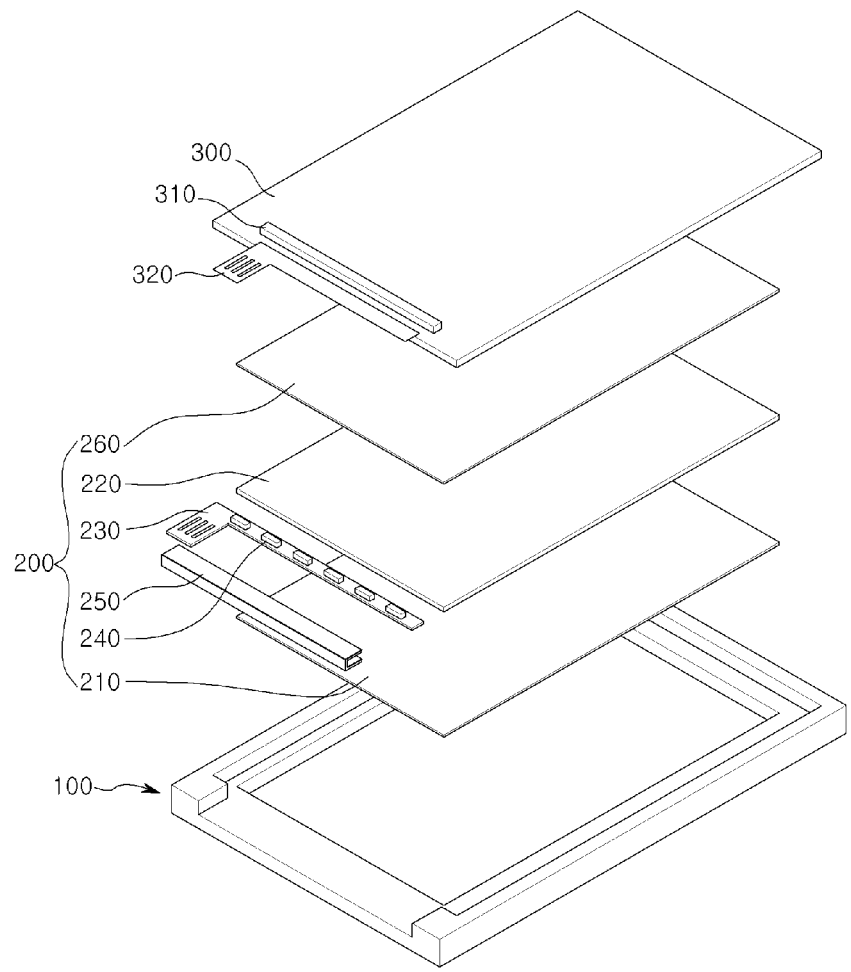
FIG. 1 is an exploded perspective view representing a liquid crystal display according to the first embodiment.

In the description of an embodiment, it will be understood that when a panel, a member, a part, a plate or a substrate is referred to being "on" or "under" another panel, another member, another part, another plate or another substrate, it can be "directly" or "indirectly" on the other panel, member, part, plate or substrate, or one or more intervening panels, members, parts, plates or substrates may be also be present. Further, the meaning of "on" or "under" must be determined based on the accompanying drawings. The thickness and size of some components shown in the drawings can be exaggerated, In addition, the size of each component does not utterly reflect an actual size.

Figure 2:
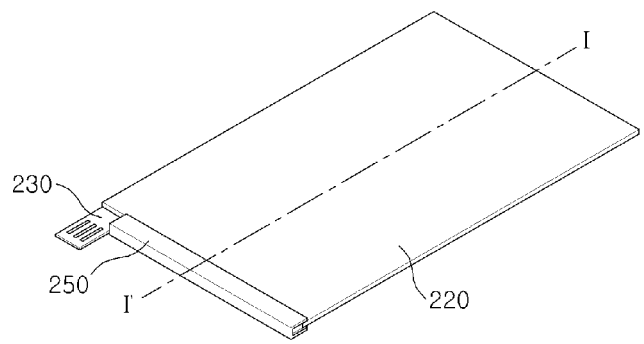
FIG. 2 is a perspective view showing a light guide plate, a support member and a light emission substrate coupled to each other.
Figure 3:
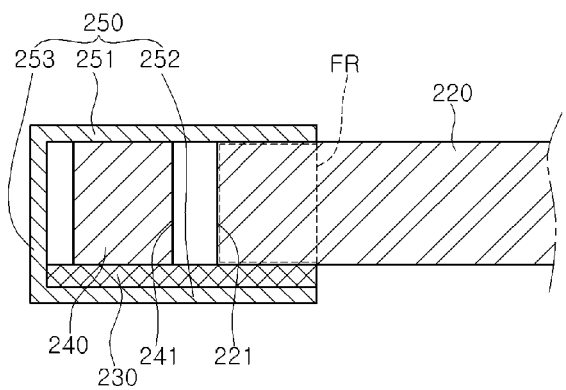
FIG. 3 is a sectional view taken along line I-I' of FIG. 2.

FIG. 1 is an exploded perspective view representing a liquid crystal display according to the first embodiment. FIG. 2 is a perspective view showing a light guide plate, a support member and a light emission substrate coupled to each other. FIG. 3 is a sectional view taken along line I-I' of FIG. 2.

As shown in FIGS. 1 to 3, a liquid crystal display includes a mold frame 100, a backlight assembly 200 and a liquid crystal panel 300.

The mold frame 100 has a rectangular frame shape. The mold frame 100 may include plastic or reinforced plastic. The mold frame 100 accommodates the backlight assembly 200 and the liquid crystal panel 300 therein.

In addition, the mold frame 100 includes rubber based resin or polyurethane resin, and has flexible property.

The backlight assembly 200 generates light and emits the light toward the liquid crystal panel 300. The backlight assembly 200 is disposed at an inner side of the mold frame 100, and includes a reflection sheet 210, a light guide plate 220, a light emission substrate 230, a light emitting diode 240, a support member 250 and an optical sheet 260.

The reflection sheet 210 is disposed at the inner side of the mold frame 100. According to another embodiment, the reflection sheet may be disposed at a lower part of the mold frame 100. The reflection sheet 210 reflects light generated from the light emitting diode 240 upward.

The light guide plate 220 is disposed on the reflection sheet 210. The light guide plate 220 is flexible. For example, the light guide plate 220 includes PMMA (poly methyl methacrylate), PS (polystyrene), PC (polycarbonate), etc. The light guide plate 220 has a thickness of 0.17 mm to 0.18 mm.

In addition, the light guide plate 220 may include flexible film.

The light guide plate 220 receives light emitted from the light emitting diode 240 to emit the light toward the liquid crystal panel 300 through reflection, refraction, scattering, etc.

The light emitting diode 240 is disposed at one side of the light guide plate 220. The light emitting diode 240 generates light and includes a light exit surface 241 through which light is emitted. The light exit surface 241 faces one surface of the light guide plate 220 (hereinafter, referred to as a light incident surface 221), which is opposed to the light emitting diode 240. In addition, the light emitting diode 240 is mounted on the light emission substrate 230.

The light emission substrate 230 is electrically connected to the light emitting diode 240, and is disposed at a side of the light guide plate 220. The light emission substrate 230 according to another embodiment can be disposed at a lower part of the light guide plate 220. The light emission plate 230 is electrically connected to a main substrate for driving the liquid crystal display such that electrical signals are applied to the light emitting diode 240.

The support member 250 is fold or bent to accommodate a part of the light guide plate 220 and the light emitting diode 240. The support member 250 supports a part of the light guide plate 220 while surrounding a light source.

In addition, the support member 250 fixes the light emitting diode 240. In addition, the support member 250 fixes a part of the light guide plate 220. The support member 250 is disposed at an upper surface and a lower surface of the light guide plate 220. The support member 250 can be attached to the upper surface and the lower surface of the light guide plate 220. The support member 250 includes a first support part 251, a second support part 252 and a connection part 253.

The first support part 251 is disposed on the light emitting diode 240 and the light guide plate 220. The first support part 251 covers the part of the light guide plate 220.

The first support part 251 supports the part of the light guide plate 220 and the light emitting diode 240. That is, the first support part 251 supports an edge (hereinafter, a support region FR) of the light guide plate 220 corresponding to the light incident surface 221.

The support region FR is a light incident region onto which light emitted from the light emitting diode 240 is incident. In addition, the remaining part of the light guide plate 220 except for the support region FR is a light emitting region through which incident light is emitted. The upper surface of the light guide plate 220 is a light exit surface through which light is emitted. In detail, a portion of an upper surface of the light guide plate 220, which is not covered with the support member 250, serves as the light exit surface.

The light incident region has the light incident surface 221, and the light emitting region has the light exit surface. That is, the light guide plate 220 is divided into the light incident region and the light emitting region. In addition, the support member 250 accommodates the light emitting diode 240 and the light incident region.

A double sided tape can be interposed between the first support part 251 and the light guide plate 220. That is, the first support 251 adheres to the light guide plate 220.

The second support part 252 is disposed in opposition to the first support part 251. That is, the first support part 251 and the second support part 252 face each other while interposing the light guide plate 220 and the light emitting diode 240 therebetween. In addition, the support region FR can be fixed by the first and second support parts 251 and 252. That is, the light incident region is fixed and supported by the support member 250.

The second support part 252 is disposed at a lower part of the light emitting diode 240 and the light guide plate 220. In more detail, the second support part 252 is disposed at a lower part of the light emission plate 230.

The second support part 252 supports the light emission substrate 230. In addition, the light emission plate 230 supports the part of the light guide plate 220 and the light emitting diode 240. Accordingly, the second support part 252 supports the part of the light guide plate 220 and the light emitting diode 240 through the light emission substrate 230.

On the other hand, the second support part according to another embodiment can directly support and fix the support region FR of the light guide plate 220.

The connection part 253 connects the first support part 251 to the second support part 252. The connection part 253 extends from an end of the first support part 251 and the second support part 252.

The first support part 251, the second support part 252 and the connection part 253 are integrally formed with each other. For example, the support member 250 includes metal.

The first support part 251 and the second support part 252 are rigid. In more detail, the first support part 251 and the second support part 252 have rigid property more than the light guide plate 220.

The first support part 251 and the second support part 252 are disposed at the upper part and the lower part of the light guide plate 220, respectively, to support the light guide plate 220. In more detail, the first support part 251 and the second support part 252 support the support region FR.

In addition, the first support part 251 and the second support part 252 longitudinally apply pressure to the support region FR in opposition to each other, so that the light guide plate 220 is fixed to the support member 250.

The optical sheet 260 is disposed on the light guide plate 220. The optical sheet 260 may improve characteristics of light passing through the optical sheet 260. For example, the optical sheet 260 includes a diffusion sheet and a prism sheet.

The backlight assembly 200 and the mold frame 100 constitute a backlight unit.

The liquid crystal panel 300 is disposed on the optical sheet 260, and is disposed at an inner side of the mold frame 100. The intensity of light passing through the liquid crystal panel 300 is adjusted by a pixel which serves as a unit for displaying images. The liquid crystal panel 300 includes a TFT substrate, a color filter substrate, a liquid crystal layer and a polarization filter, in which the liquid crystal layer and the polarization filter are interposed between the TFT substrate and the color filter substrate.

The liquid crystal panel 300 is electrically connected to the main substrate through a connection substrate 320.

In addition, the liquid crystal panel 300 is flexible. That is, the liquid crystal panel 300 includes the TFT substrate including a film substrate, the color filter substrate including a film substrate and the liquid crystal layer interposed between the TFT substrate and the color filter substrate.

In addition, the liquid crystal display includes a driver IC 310 which is mounted on the liquid crystal panel 300 to drive the liquid crystal panel 300.

A part of the light guide plate 220 is supported by the first support part 251 and the second support part 252. That is, the support region FR is supported by the first and second support parts 251 and 252. In addition, the support region FR and the light emitting diode 240 are fixed to the support member 250.

Accordingly, although the light guide plate 220 is flexible, the light emitting diode 240 and the support region FR corresponding to the light incident region can be supported and fixed. The light incident surface 221 is fixedly maintained while keeping a constant interval relative to the light exit surface 241.

Accordingly, in the case that a plurality of light emitting diodes 240 are disposed, the light exit surface 241 of each light emitting diode 240 is spaced apart from the light incident surface 221 by a predetermined interval, so that the liquid crystal display according to the present embodiment provides uniform brightness.

In addition, since the interval between the light incident surface 221 and the light exit surface 241 is not increased, the light incident surface 221 and the light exit surface 241 are parallel to each other. That is, the support region FR can be supported such that the light incident surface 221 and the light exit surface 241 are not tilted against each other.

Accordingly, large quantity of light can be incident through the light incident surface 221, and the liquid crystal display according to the present embodiment provides superior brightness.

In addition, according to the liquid crystal display of the present embodiment, event if the light guide plate 220 has a thin thickness, superior brightness and brightness uniformity are ensured. For this reason, the light guide plate 220 having a slim structure can be realized.

In addition, the mold frame 100 and the liquid crystal panel 300 can be flexible and the light guide plate 220 can be flexible. Accordingly, the liquid crystal display according to the present embodiment can be flexible. Even though the light guide plate 220 is flexible, the brightness and brightness uniformity are not degraded but improved.

According to the present embodiment, the liquid crystal display can be realized in a flexible structure.

Figure 4:
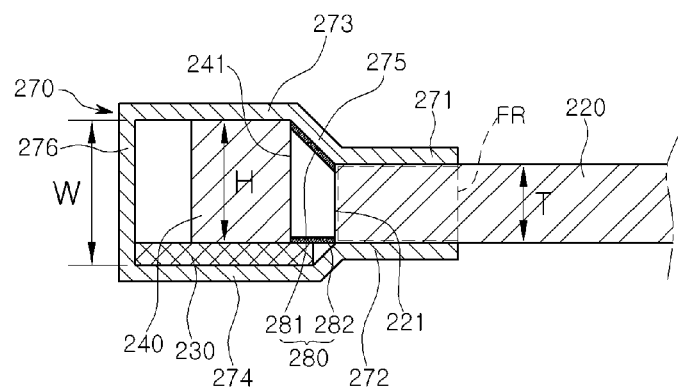
FIG. 4 is a sectional view showing a support member, a reflection member, a light emission substrate, a light emitting diode and a light guide plate according to the second embodiment.

FIG. 4 is a sectional view showing a support member, a reflection member, a light emission substrate, a light emitting diode and a light guide plate according to the second embodiment. In the present embodiment, the support member, the light emitting diode and the light emission substrate will be additionally described.

Referring to FIG. 4, a liquid crystal display includes the support member 270, the reflection member 280, the light emission substrate 230, the light emitting diode 240 and the light guide plate 220.

The support member 270 is folded or bent, thereby surrounding the light emitting diode 230. The support member 270 includes a first support part 271, a second support part 272, a third support part 273, a fourth support part 274, an inclination part 275 and a connection part 276.

The first support part 271 is disposed on the light guide plate 220 to support an upper surface of the support regions FR of the light guide plate 220.

The second support part 272 is disposed below the light guide plate 220 to support a lower surface of the support regions FR.

That is, the support region FR is supported by the first support part 271 and the second support part 272. In addition, the support region FR is fixed to the support member 270 by the first support part 271 and the second support part 272. The support member 270 has elasticity by which the support region FR is fixed.

The third support part 273 is connected to the first support part 271 by the inclination part 275. The third support part 273 is disposed on the light emitting diode 240.

The fourth support part 274 is disposed below the light emitting diode 240. The fourth support part 274 is disposed below the light emission substrate 230 to support the light emission substrate 230. In addition, the fourth support part 274 fixes the light emission substrate 230 and the light emitting diode 240.

The fourth support part 274 is fold or bent while extending from the second support part 272.

The inclination part 275 is connected to the first support part 271 and the third support part 273. The inclination part 275 is inclined with respect to the first support part 271. The inclination part 275 is fold or bent while extending from the first support part 271. The third support part 273 is fold or bent while extending from the inclination part 275.

The connection part 276 connects the third support part 273 to the fourth support part 274. In more detail, the connection part 276 is connected to an end of the third support part 273 and the fourth support part 274.

The light emitting diode 240 is disposed at an inner side of the third support part 273, the connection part 276 and the fourth support part 274. The light guide plate 220 is supported by the first support part 271 and the second support part 272.

A distance W between the third support part 273 and the fourth support part 274 is longer than a distance T between the first support part 271 and the second support part 272. Accordingly, a height of the light emitting diode 240 is greater than the thickness T of the light guide plate 220.

The reflection member 280 includes a first reflection member 281 and a second reflection member 282.

The first reflection member 281 is disposed inside the support member 270. In more detail, the first reflection member 281 is disposed at a lower part of the inclination part 275.

The second reflection member 282 is disposed on the light emission substrate 230.

In addition, the reflection member 280 can be formed at the entire inner surface of the support member 270. In addition, the reflection member 280 can be formed at the entire surface of the support member 270.

The reflection member 280 reflects light emitted from the light emitting diode 240. For example, the reflection member 280 includes white paint or white ink.

Since the height H of the light emitting diode 240 is greater than the thickness T of the light guide plate 220, the liquid crystal display according to the second embodiment provides superior brightness regardless of the thickness T of the light guide plate 220.

In addition, the light emitted from the light emitting diode 240 is reflected by the reflection member 280 and is not absorbed by the support member 270 and the light emission substrate 230.

Accordingly, the liquid crystal display according to the present embodiment can provide improved brightness.

In addition, according to the liquid crystal display of the present embodiment, the thickness of the light guide plate can be reduced while ensuring superior brightness of the liquid crystal display. Accordingly, the liquid crystal display can be fabricated in a slim structure.

Figure 5:
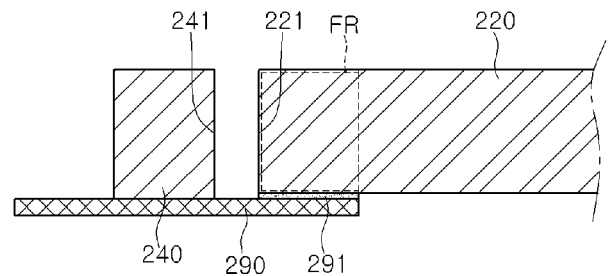
FIG. 5 is a sectional view showing a light emission substrate, a light emitting diode, a light guide plate and an adhesion member.

FIG. 5 is a sectional view showing a light emission substrate, a light emitting diode, a light guide plate and an adhesion member. In the present embodiment, the light emission substrate and the adhesion member will be additionally described.

Referring to FIG. 5, the liquid crystal display includes the light emission substrate 290 having rigid property. For example, the light emission substrate 290 includes a rigid printed circuit board. The light emitting diode 240 is mounted on the light emission substrate 290, and a part of the light emission substrate 290 is disposed at a lower part of the light guide plate 220.

In addition, the liquid crystal display includes the adhesion member 291. The adhesion member 291 is interposed between the light emission substrate 290 and the light guide plate 220. The adhesion member 291 is attached to the light emission substrate 290 and the light guide plate 220 such that the light guide plate 220 is attached to the light emission substrate 290.

Accordingly, the support region FR of the light guide plate 220 is attached to the light emission substrate 290 and is supported by the light emission substrate 290, so that the support region FR serving as the light incident region is not shaken.

Therefore, the liquid crystal display according to the present embodiment can ensure improved brightness and uniform brightness and can be realized in a slim structure.

Although few embodiments of the present invention have been shown and described, the above embodiment is illustrative purpose only, and it would be appreciated by those skilled in the art that changes and modifications, which have not been illustrated above, may be made in these embodiments without departing from the principles and scope of the invention, the scope of which is defined in the claims and their equivalents.

Industrial Applicability

The display device and the backlight unit according to the embodiment can be applied to a display industry.

The invention claimed is:

1. A display device comprising:
   a display panel configured to display images; and
   a backlight unit configured to provide light to the display panel,
   wherein the backlight unit includes:
   a flexible light guide plate;
   a light source disposed at one side of the light guide plate; and
   a support member accommodating the light source and a part of the light guide plate to fix and support the light source and the light guide plate,
   wherein the support member comprises:
   a first support part and a second support part that face each other while interposing the light source therebetween,
   a connection part connecting the first support part and the second support part to each other,
   a third support part and a fourth support part, which are connected to the first support part and the second support part, respectively, to support the light guide plate,
   a first inclination part connecting the first support part to the third support part and is inclined with respect to the first support part,
   a second inclination part connecting the second support part to the fourth support part and is inclined with respect to the second support part, and
   a light emission substrate electrically connected to the light source to apply driving signals,
   wherein the light emission substrate is disposed between the light source and the second support part,
   wherein a first reflection member is disposed on an inner surface of the first inclination part, and
   wherein a second reflection member is disposed directly on the light emission substrate.

2. The display device as claimed in claim 1, wherein the third support part and the fourth support interpose the light guide plate therebetween.

3. The display device as claimed in claim 2, wherein the light source and the part of the light guide plate are accommodated at an inner side of the first support part, the second support part, the connection part, the third support part and the fourth support part.

4. The display device as claimed in claim 1, wherein the support member supports an upper surface of the light guide plate and a lower surface of the light guide plate facing the upper surface while surrounding the light source.

5. The display device as claimed in claim 1, further comprising a reflection part disposed at one surface of the support member.

6. A backlight unit comprising:
   a light source emitting light;
   a light guide plate, in which a light incident region having a light incident surface onto which light is incident and a light exit region through which the incident light is emitted are defined; and
   a support member fixing and supporting the light source and the light incident region,
   wherein the support member of the backlight unit comprises:
   a first support part and a second support part that face each other while interposing the light guide plate therebetween,
   a third support part and a fourth support part which extend from the first support part and the second support part, respectively, and face each other while interposing the light source therebetween,
   a connection part connecting the third support part to the fourth support part,
   first inclination part connecting the first support part to the third support part and is inclined with respect to the third support part,
   a second inclination part connecting the second support part to the fourth support part and is inclined with respect to the fourth support part, and
   a light emission substrate electrically connected to the light source to apply driving signals,
   wherein the light emission substrate is disposed between the light source and the fourth support part
   wherein a first reflection member is disposed on an inner surface of the first inclination part, and
   wherein a second reflection member is disposed directly on the light emission substrate.

7. The backlight unit as claimed in claim 6, wherein the support member fixes and supports an upper part and a lower part of the light incident region.

8. The backlight unit as claimed in claim 6, wherein the light guide plate is fixed by the first support part and the second support part, and the light source is fixed by the third support part and the fourth support part.

9. The backlight unit as claimed in claim 6, wherein the first, second, third, and fourth support parts are integrally formed with each other, and comprise a metal, and
   wherein the light source and the light incident region are accommodated in the support member.

10. The backlight unit as claimed in claim 6, wherein the light guide plate is flexible and the support member is rigid.

11. The display device as claimed in claim 1, wherein a space is created between the light source and the light guide plate by the light source being separated a predetermined distance apart from the light guide plate, and
  wherein the first and second light reflection members are disposed to face each other in the created space.

12. The backlight unit as claimed in claim 6, wherein a space is created between the light source and the light guide plate by the light source being separated a predetermined distance apart from the light guide plate, and
  wherein the first and second light reflection members are disposed to face each other in the created space.

13. The display device as claimed in claim 1, wherein the light guide plate has a uniform thickness, and a height of the light source is greater than or equal to the uniform thickness of the light guide plate.

14. The backlight unit as claimed in claim 6, wherein the light guide plate has a uniform thickness, and a height of the light source is greater than or equal to the uniform thickness of the light guide plate.

15. The display device as claimed in claim 1, wherein the first and second inclination parts are disposed respectively on different planes, and face each other.

16. The backlight unit as claimed in claim 6, wherein the first and second inclination parts are disposed respectively on different planes, and face each other.

17. The display device as claimed in claim 1, wherein the first reflection member is different from the second reflection member, and is separated from the second reflection member by a space.

18. The backlight unit as claimed in claim 6, wherein the first reflection member is different from the second reflection member, and is separated from the second reflection member by a space.

* * * * *